Figure 1:
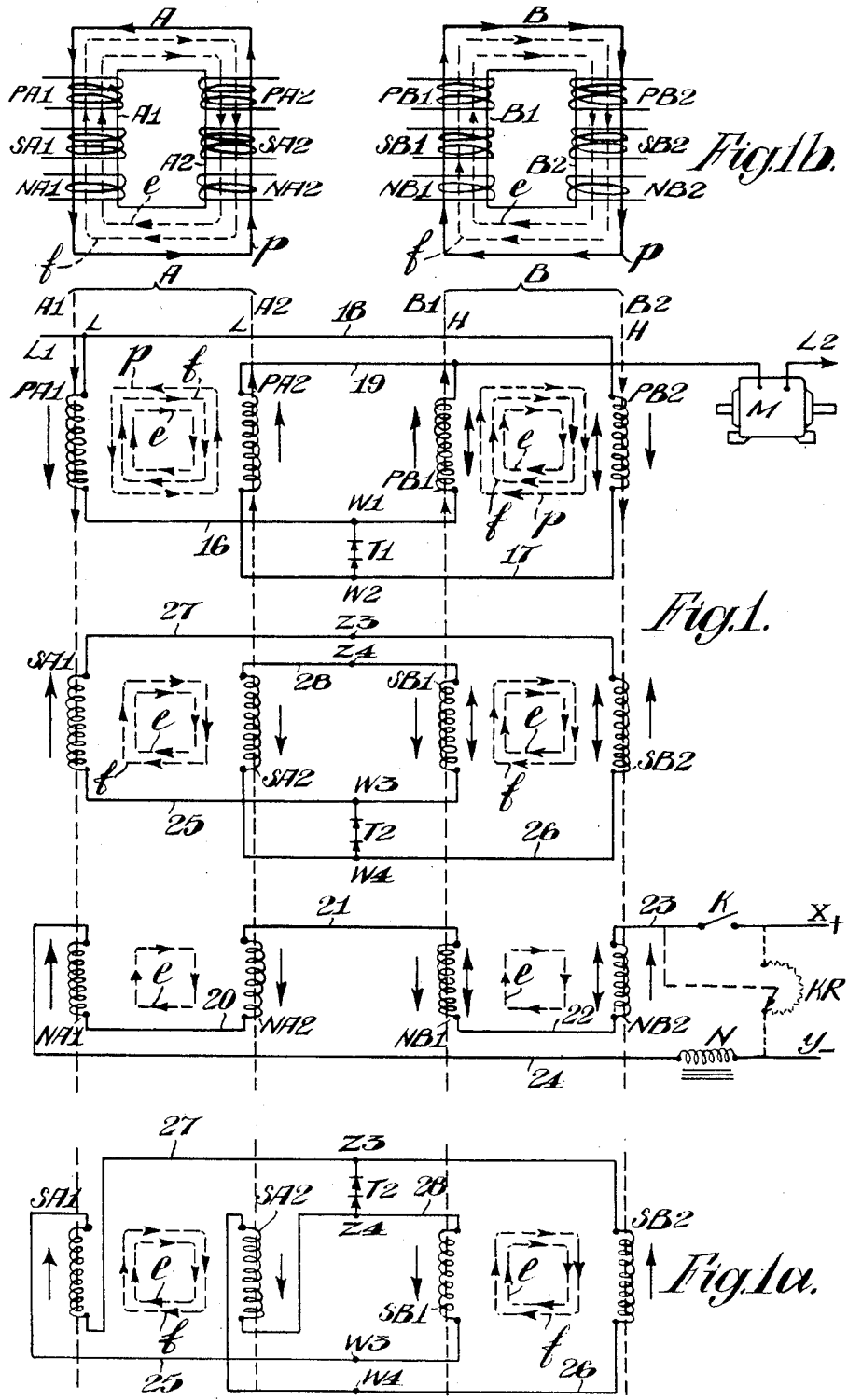

Sept. 18, 1962    W. BROOKE ETAL    3,054,944
ELECTRIC REMOTE CONTROL DEVICES
Filed April 21, 1960    4 Sheets-Sheet 3
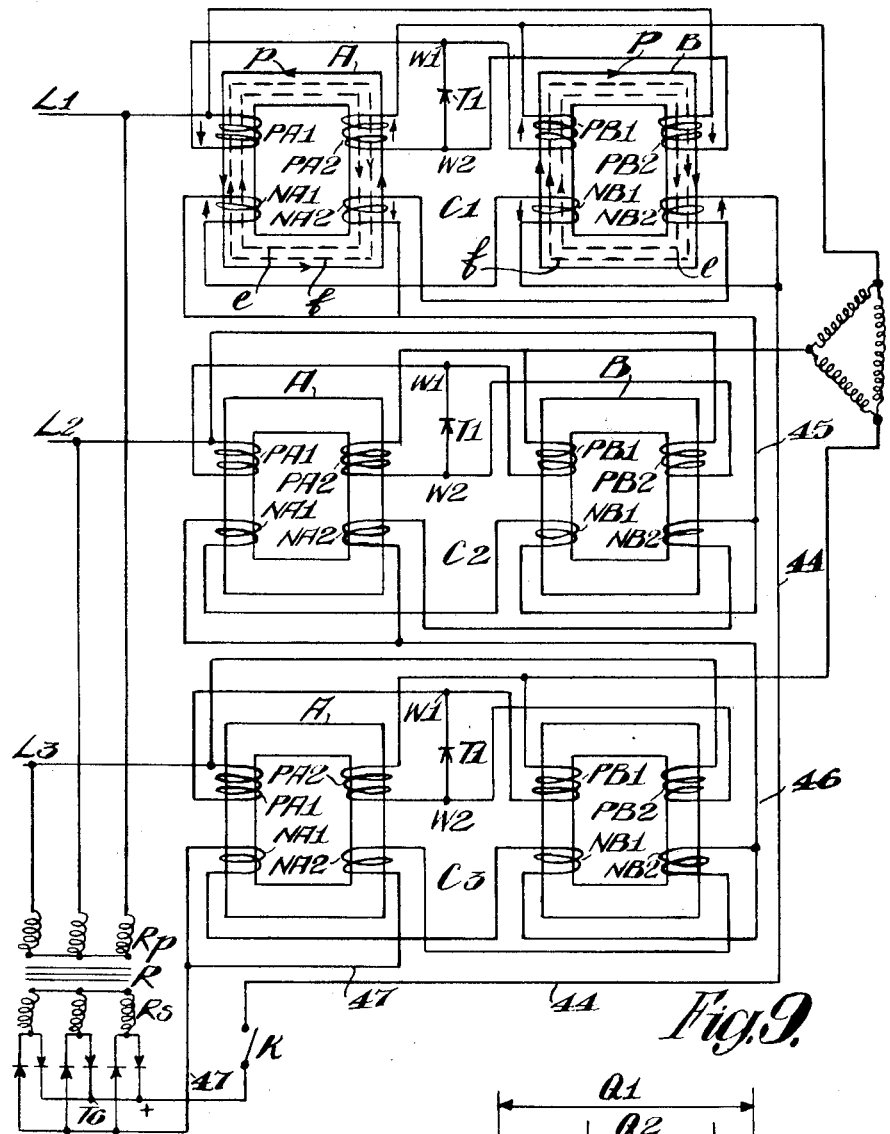
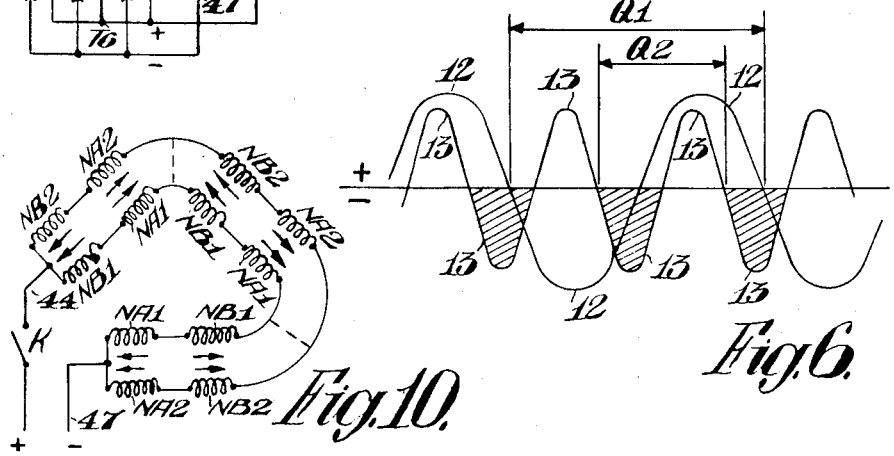

United States Patent Office 3,054,944
Patented Sept. 18, 1962

1

3,054,944
ELECTRIC REMOTE CONTROL DEVICES
Wilfrid Brooke, 13 Carlton Road, Hale, England, and Harry Howe, Three Ways, Chapel Lane, Hale Barns, England
Filed Apr. 21, 1960, Ser. No. 23,815
Claims priority, application Great Britain May 11, 1959
14 Claims. (Cl. 323—89)

This invention relates to improvements in electric remote control devices of the saturable reactor type where the latter are employed for controlling single or polyphase electric power supplies to, for example, motors and other inductive apparatus with which the devices are directly or indirectly connected in series.

The object of the invention is to provide a modified form of saturable reactor having an improved form of self-excited feed-back excitation which will enable higher relative initial impedance values in the un-excited condition and lower stable impedance values in the excited condition to be realised than is possible with conventional apparatus of this kind, particularly when operating on inductive loads, such as for starting and stopping squirrel cage motors where the starting current may well be many times the full load value depending upon its state of loading.

According to the present invention a saturable reactor arrangement of the series connected type comprises two closed magnetic cores each provided with a main winding consisting of two separate but identical portions or half-windings together with suitable supplementary excitation windings mutually non-inductively arranged with respect to the main or A.C. magnetisation, the two main half-windings on one core being connected in series with their counterpart half-windings on the other core, the two groups of windings thus formed being connected in parallel but mutually reversed, the main or A.C. fluxes in the two cores being respectively assisted and opposed by the supplementary excitation magnetisation when same is applied to the excitation windings from a D.C. or equivalent uni-directional source thereby causing a state of relative magnetic unbalance to arise between the fluxes in the two cores together with a corresponding relative unbalance of the instantaneous voltages across the main half-windings on each core comprising each group, whereby as a result of the mutually reversed parallel connection of the two winding groups, and A.C. voltage is produced between the junction or mid-points of the two windings groups—the frequency of which is double that of the supply system in consequence of the periodic saturation of the cores when the A.C. and D.C. fluxes are mutually assisting, between the said mid-points of the winding groups is connected a directional rectifier thereby establishing two local circuits each comprising two main half-windings in series, one bearing a high and the other a low instantaneous voltage during, say, the positive half-cycles of the supply volts with the converse relationship during the negative half-cycle each local circuit being completed by the directional rectifier common to both which permits a circulating current to flow through the main half windings comprising each local circuit simultaneously during say the positive half cycle of the double frequency source residing within each main winding group and which due to the fact that a positive and negative half cycle of same appears during both the positive and negative half-cycles of the normal frequency supply voltage, produces a self-excited feed-back excitation of the cores from the existing main winding system in the same direction as the supplementary excitation as determined by the polarity of the directional rectifier, thus assisting the latter excitation in reducing the impedance of the reactor from a high value in the unexcited condition to

2 a consistently low stable value over a wide load range when in the excited condition.

The reactor may also have additional separate feed-back windings inter-connected in a similar or equivalent manner to the main windings as far as feed-back is concerned.

Figure 2:
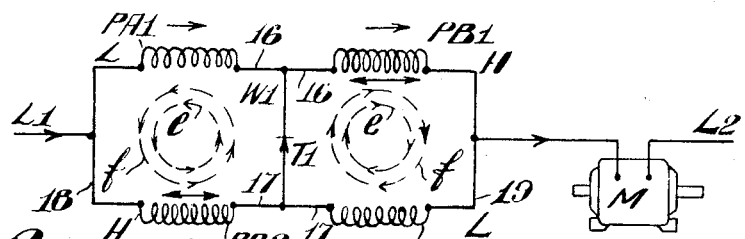
Figure 4:
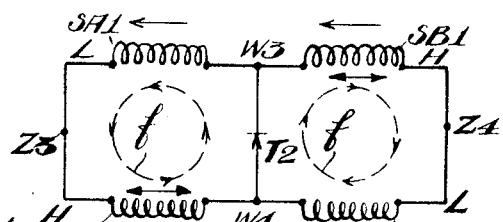
Figure 3:
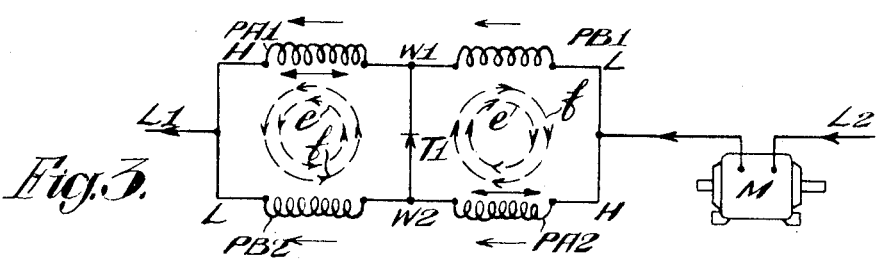
Figure 5:
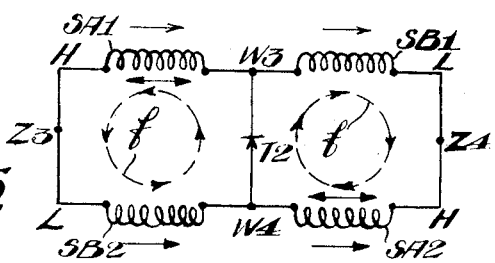
Figure 7:
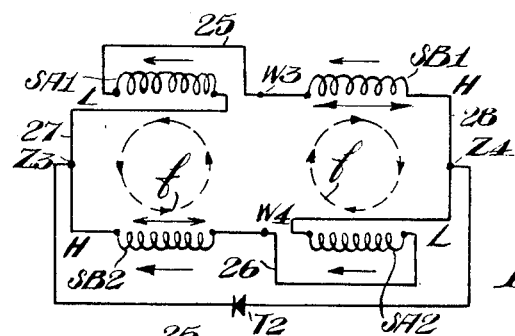
Figure 8:
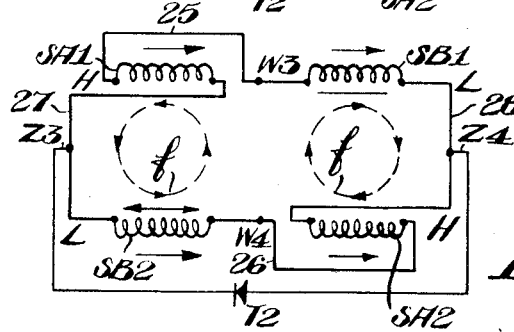
Figure 11:
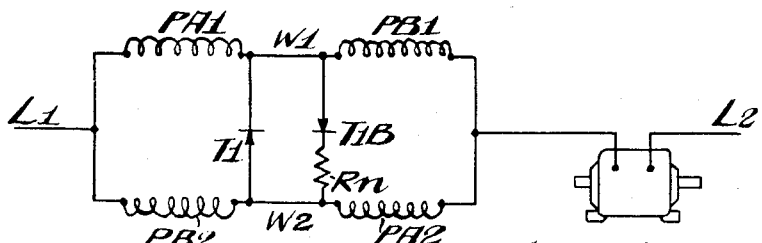

Embodiments of the invention will now be described with reference, by way of example, to the accompanying drawings in which:

FIGURES 1 and 1A show schematically embodiments of the arrangement for operating a single-phase motor, FIGURE 1B shows the two cores with the windings thereon, FIGURES 2 and 3 show schematic diagrams of the main windings during the positive and negative half-cycles respectively, FIGURES 4 and 5 show corresponding arrangements to FIGURES 2 and 3 in respect to the feed-back windings, FIGURE 6 shows the wave-forms of the voltages in the local circuits, FIGURES 7 and 8 show schematic diagrams of alternative connections of feed-back windings during the positive and negative half-cycles respectively, FIGURE 9 shows an adaption of the arrangement for the operation of three-phase motors, FIGURE 10 shows a schematic diagram of alternative supplementary excitation circuits as may be employed in FIGURE 9, and FIGURE 11 shows a schematic diagram of a modification of FIGURE 2 to provide in addition a small amount of negative feedback.

In the figures corresponding circuit parts are indicated by the same reference characters.

Referring to FIGURES 1 and 1B, there is shown an arrangement of a modified form of saturable reactor as applied to the starting and stopping of a squirrel cage motor M operating in series with it across a single phase supply system L1—L2. The reactor comprises two identical closed magnetic circuits A and B constructed from high permeability grain oriented magnetic material such as silicon-iron or nickel-iron alloys in the form of spiral cores wound from magnetic strip material or constructed from stacked laminations in any of the usual commercial forms or shapes.

Two identical main half windings are provided on each of the cores A and B, one embracing each of the limbs A1 and A2 of core A and one embracing each of the limbs B1 and B2 of core B. This form of presentation has been adopted for the sake of clarity and is purely diagrammatic. The windings PA1 and PA2 on core A are connected respectively in series with their counterparts—windings PB1 and PB2 on core B—through connections 16 and 17, the two groups of windings being connected in parallel through connections 18 and 19 but mutually reversed. Connection 18 is connected to single phase supply line L1 and connection 19 is connected to one terminal of the squirrel cage motor M, whilst the other terminal of the motor is connected to supply line L2.

Two identical excitation half windings NA1 and NA2 are provided on core A and similar windings NB1 and NB2 on core B, these are connected in series by connections 20, 21, and 22 and are connected to a D.C. or equivalent source of supply X and Y through control switch K and connections 23 and 24 and a choke N.

When the reactor and motor M in series therewith are connected to the supply system in the manner shown with the control switch K open, the current taken from the supply is merely the small amount of magnetising current of the reactor the impedance of which is high, as most of the supply volts are distributed equally across the main windings of each group PA1—PB1 and PA2—PB2 the volts across each being approximately half the supply voltage whilst the voltage across the motor M is practically zero. The instantaneous directions of the main flux during, say, the positive half cycle are shown by arrows within the axes of the main windings PA1, PA2, and PB1, PB2. The A.C. main flux is shown circulating in a counter-clockwise direction in core A, down limb A1, and up limb A2, whilst the A.C. main flux in core B circulates clockwise, these directions being also indicated in the concentrically dotted paths at $p$. The full line arrows at the side of the main windings PA1 etc. indicate the instantaneous direction of the applied voltage and current during the positive half cycle, these references being opposite of course during the negative half cycle.

When supplementary excitation is applied from a D.C. or equivalent source X—Y to the reactor on the closure of control switch K a uni-directional excitation flux is created in the cores A and B in a clockwise direction in each as indicated in the dotted paths $e$. The full line arrows at the side of the excitation windings indicate the instantaneous directions of the induced voltages arising from the couplings with the main A.C. windings during the positive half cycles, and from which it will be noted that the inductive voltages are cumulative in the excitation windings NA1 and NA2 as they are also in windings NB1 and NB2 but the aggregate induced voltages in the two groups are mutually opposite and therefore neutralised overall.

It will now be noted from the upper portion of the diagram that the direction of the A.C. main magnetisation during the positive half-cycle is counter-clockwise in core A and clockwise in core B, whilst the excitation magnetisation therein is clockwise in both, hence the overall flux in core A will be low in the limbs A1 and A2 as represented by L, L, whilst the flux in core B will be high in the limbs B1 and B2 as represented by H, H and the instantaneous distribution of potentials across the main half windings will be correspondingly low and high, as may be seen more clearly from the diagrammatic representation in FIGURE 2, the instantaneous potentials across windings PB1 and PB2 being high and those across PA1 and PA2 being low. The direction of the applied voltage and current in the main windings are indicated by the full line arrow as they appear during the positive half-cycle. Under these circumstances an A.C. potential equal to the difference between the high and low instantaneous potentials across the main half windings will become established across the mid-points W1 and W2 of the two winding groups as the result of the relative magnetic unbalance in the two cores and also to the mutually reversed parallel-connected winding groups.

As is well known, an induced harmonic voltage arises in all saturable magnetic apparatus of this kind which becomes superimposed on the main windings due to the additive and subtractive characteristics of the alternating and uni-directional fluxes from the main and excitation winding systems, the frequency of which is double that of the supply system—consequently there appears a positive and negative induced voltage within the main winding during each half-cycle of the applied volts.

According to the arrangement of the main windings in the present invention this usually undesirable harmonic voltage is caused to appear across the mid-points W1—W2 of the two main winding groups where it may usefully be employed as a source for providing feedback excitation. In this connection a low voltage single-wave directional rectifier T1 is connected in the appropriate direction across the said mid-points W1—W2, thereby establishing two local circuits—one comprising the main windings PA1 and PB2 complete by the rectifier T1, the other circuit comprising the windings PB1 and PA2 also connected in series and completed by the rectifier T1 which is common to the two circuits. A circulating current will flow as a result of the induced harmonic voltage during the positive half cycle of the latter from the winding PB2—bearing the high voltage and marked H in its usual or normal direction as shown by the full line arrow, through the directional rectifier T1 and returning through winding PA1—bearing the low voltage marked L—in a direction opposite to that of the normal main current through it as shown by the full line arrow on same, back to winding PB2. At the same time a circulating current will flow from the winding PB1—bearing the high voltage and marked H—in its usual or normal direction, through the winding PA2—bearing the low voltage and marked L—in a direction opposite to that of the normal current through it, returning through the directional rectifier T1 to winding PB1. These circulating currents will flow simultaneously in the two circulatory circuits completed by the rectifier T1 and will produce a feed back excitation as shown in the dotted concentric paths marked $f$—$f$ respectively FIGURE 2 which is in the same direction as the excitation magnetisation in the paths corresponding thereto marked $e$—$e$ which are both clockwise and correspond with the equivalent paths shown in FIGURE 1, and thus the feedback excitation assists the supplementary excitation as is intended.

It should be explained that whilst the directions of the feedback and excitation magnetising forces, as shown dotted in FIGURES 2, 3, 4, 5, 7 and 8, appear to be mutually reversed in the two local circulatory circuits they are in fact in the same mutual direction as shown in FIGURE 1. This is due to the purely diagrammatic method of representation employed wherein the cores A and B are assumed to be lying flat, the former having been turned forwards and the latter backwards, as viewed from above, thus core B is viewed normally as in FIGURE 1 whilst core A is viewed from behind in respect to FIGURE 1 as will be understood by these skilled in these techniques.

During the negative half cycle the directions of the main or A.C. magnetisation becomes opposite to those shown in FIGURE 1 at $p$, in that, it now becomes clockwise in core A and counter-clockwise in core B, whilst the direction of the supplementary excitation as shown at $e$ remains the same as before which is clockwise in both cores. It will, therefore, be noted that the A.C. and excitation magnetisations are in like direction in core A and opposite in direction in core B, hence the flux in core A is now high and that in core B is low. The effect of this may now be observed from FIGURE 3 which shows in similar manner to FIGURE 2 the state of affairs during the negative half-cycles, where the full line arrows show the reversed direction of the supply current—and applied voltage—in the main windings during this period and an A.C. induced potential of double the normal frequency again appears across the mid-points W1—W2 of the windings as before, as a result of the harmonic voltage also arising during the positive half cycles of same. A circulating current thereupon flows from the main winding PA1—now bearing the high voltage and marked H—in its usual or normal direction as indicated by the arrow on same, through winding PB2—of low voltage and marked L—in the opposite direction to normal and returning through the rectifier T1 to winding PA1. At the same time a circulating current will flow from winding PA2—of high voltage and marked H in the normal direction as shown, through the directional rectifier T1 and returning through winding PB1—of low voltage and marked L—in the opposite direction to normal, back to winding PA2. The source of the harmonic voltages resides in the main half windings bearing the high instantaneous voltages as indicated by the double headed arrows applied to the windings in the various diagrams.

It will thus be noted that the circulating feedback currents in the two local circuits flow simultaneously through the two main winding systems and in the same mutual directions, both clockwise as shown at paths e and f during both the positive and negative half cycles as a result of the commutating action of the relative unbalancing of the fluxes in the cores and the direction of the main current, both of which becomes mutually reversed during the recurring cyclic changes, and to the directional rectifier whose function is to allow the circulating harmonic currents to pass during the positive half cycles of same and to reject the unwanted negative half cycles.

These uni-directional circulating currents provide a feed-back excitation in the existing main windings of the same nature and direction as the supplementary excitation which augments the latter at all times. Thus on starting the squirrel cage motor a powerful feed-back current becomes available, the value of which depends on the amount of the unbalance voltage available across the mid-points of the two winding groups, this being the difference between the high and low instantaneous voltages across the windings in the two local circuits, as determined by the amount of supplementary excitation applied and also upon the resistance or impedance of the windings and rectifier comprising the local circuits which collectively are instrumental in reducing the impedance of the reactor sufficiently to enable it to pass the large starting currents of many times full load value as demanded by the motor.

When the motor M has run up to its normal speed and no longer requires the large starting and accelerating current the feed-back excitation automatically decreases with the main current as also does the voltage across the reactor—maintaining the impedance of the latter at an approximately constant low level over a wide range of loading, this impedance level being governed by the amount of supplementary excitation employed becoming decreased as the excitation is increased within the limits of saturation, or vice versa.

The arrangement according to the invention permits the maximum amount of feed-back to be realised without the usual instability normally associated with so-called over-dimensioned feedback excitation, as applied in the conventional manner, and moreover enables the impedance of the reactor to be reduced under excited conditions to a much lower value than is possible with conventional apparatus without considerably increasing its physical size, whilst when in the un-excited condition there is no magnetic unbalance and hence no feeding-back of the magnetising current and the consequent reduction of the value of the standing impedance of the reactor as when employing conventional forms of feed-back excitation.

Separate feed-back windings may be provided but are not essential from an operational point of view, since the maximum amount of feed-back excitation may be obtained from the main winding system alone. If, however, feed-back excitation is derived from the main and feed-back winding systems jointly then the feed-back excitation will be shared as if the two winding systems were operating in parallel. On the other hand, the feed-back excitation may be provided wholly by the feed-back winding system if it is desired that the latter should be galvanically insulated from the main supply system, as for instance, in certain high tension applications, or even where low voltage-high current apparatus is involved. In the latter case considerable latitude is available where separate feed-back windings are employed—since equivalent results would be obtained with a higher number of winding turns which will produce a correspondingly lower feed-back current or vice versa on an equivalent ampere-turn basis, and in this connection the apparatus functions as a current transformer as far as the self-excited feed-back is concerned, whereas with conventional feed-back arrangements obtained through bridge rectifiers connected in the main circuit no alternative choice of current values is available unless separate current transformers are employed in each phase.

Separate feed-back windings are shown in FIGURE 1 wherein two identical sets of such windings are provided, windings SA1 and SA2 being wound on core A and connected in series with their counterpart windings SB1 and SB2 on core B, through connections 25 and 26 respectively and closely coupled with the main windings with which they are associated. The two winding groups are connected mutually in parallel by connections 27 and 28 but mutually reversed precisely as the main windings already described.

A low voltage directional rectifier T2 is connected between the mid-points W3 and W4 of the two feed-back winding groups, thereby, establishing two local circuits—one comprising the windings SA1 and SB2 completed by the rectifier T2 and the other comprising the windings SA2 and SB1, also completed by the rectifier T2 common to both circuits as shown more clearly in FIGURE 4 which represents diagrammatically the state of affairs during the positive half cycles. When excitation is applied to the reactor producing a magnetic unbalance in the cores as already described an induced A.C. harmonic potential of double the supply frequency becomes established across the mid-points W3 and W4 of the winding groups precisely as in the main windings and circulating currents flow simultaneously in the feedback windings in the two local circuits generally as already described in connection with the main windings. The normal induced voltages across the feedback windings are opposite in direction at the same instant as those across the corresponding main winding in view of their anti-phase relationship with the latter, as will be noted from the full line arrows beside the feed-back windings SA1, SA2, SB1 and SB2, the double headed arrows near the latter windings representing the directions of the double frequency harmonic voltages across them.

Circulating currents will flow simultaneously in the two local circuits, one flowing from winding SB1 bearing the high voltage, and marked H, during the positive half-cycle of the harmonic voltage—in the direction opposite to normal, through winding SA2—bearing the low voltage and marked L—in the same direction as the normal induced voltage across same, returning through the directional rectifier T2, back to winding SB1, whilst the other will flow from winding SB2 bearing the high voltage and marked H—also during the positive half-cycle of the harmonic voltage, in the direction opposite to normal, through the rectifier T2, through winding SA1—bearing the low voltage and marked L—in the same direction as the induced voltage across same, back to winding SB2—thus the two circulating currents will flow in mutually the same direction through the windings producing feed-back excitation similar in direction to that produced in the main windings and also to that of the supplementary excitation and augmenting same, that is clockwise as shown in the dotted paths at e and f.

FIGURE 5 shows the corresponding state of affairs in the feed-back local circulatory circuits during the negative half-cycles where the normal induced voltages are shown opposite in direction to those in FIGURE 4 and also opposite to those in the main windings as shown in FIGURE 3. It would be noted from FIGURE 5 that the circulatory currents in the local circuits flow from the windings SA1 and SA2 bearing the high voltages and marked H—during the positive half-cycles of the harmonic voltage, returning through windings SB2 and SB1 respectively—bearing the lower voltages and marked L—in the same direction as the supplementary excitations precisely as before in a clockwise direction, thereby, providing a uni-directional feed-back excitation simultaneously in the two local circuits during both positive and negative half-cycles, which assist the supplementary excitation.

An alternative arrangement of interconnecting the feedback windings is shown in FIGURE 1A which differs only from FIGURE 1, in that, the connections 25 and 27 to the winding SA1 are reversed, as are also the connections 26 and 28 to the winding SA2.

In the arrangement shown in FIGURE 1 the potential across the mid-points W3—W4 of the feed-back winding system is zero in the unexcited condition and maximum in the excited condition, whilst that across the points Z3—Z4 is maximum in the unexcited condition and zero in the excited condition.

In the FIGURE 1A arrangement the state of affairs of the potentials across the points W3—W4 and Z3—Z4 are the converse of those in FIGURE 1 but the operational results of the two arrangements are the same as will be noted from FIGURES 7 and 8 which show the directions of potentials across the windings and the circulating feed-back currents in the local circuits during the positive and negative half-cycles respectively.

In view of the converse relationships of the respective potentials from the FIGURE 1 arrangement as described, the effective mid-points of the winding systems now becomes Z3—Z4 across which the directional rectifier T2 is connected—these being the points of zero potential when the reactor is unexcited.

FIGURE 7 shows the state of affairs as to directions of potentials and circulating currents corresponding to FIGURE 1A during the positive half-cycles of the supply voltage in the excited condition, from which it will be noted that a circulating feed-back current will flow from winding SB1—bearing a high voltage and marked H—during the positive half-cycle of the induced harmonic voltage therein in the direction opposite to normal, through connection 28 and Z4, through the directional rectifier T2 to the point Z3, through connection 27 to winding SA1—bearing a low voltage and marked L—in the same direction as the normal induced voltage therein, through connection 25 to point W3, back to winding SB1—this constituting one of the two local circuits. Simultaneously with this a circulating current will flow through the other local circuit from winding SB2—bearing a high voltage and marked H—also during the positive half-cycle of the induced harmonic voltage and opposite to normal direction, through connection 26 to point W4, through winding SA2—bearing a low voltage and marked L—in the same direction as the normal induced voltage therein, through connection 28 to point Z4, through the directional rectifier T2 common to both local circuits to point Z3, through connection 27—back to winding SB2. These circulating currents produce feed-back excitations in a clockwise direction in each core which assists the supplementary excitation as is required.

FIGURE 8 shows the corresponding state of affairs during the negative half-cycle of the supply voltage—from which is will be noted that a circulating current flows from winding SA1—now bearing a high voltage and marked H—during the positive half-cycle of the harmonic induced voltage therein and opposite to normal direction, through connection 25, point W3, through winding SB1—now bearing a low voltage and marked L—in the same direction as the normal induced voltage therein, through connection 28 to point Z4, through the directional rectifier T2 to point Z3, through connection 27—back to winding SA1. At the same time a circulating current flows from winding SA2—now bearing a high voltage and marked H—during the positive half-cycle of the harmonic induced voltage therein and opposite to normal direction, through connection 28 to point Z4, through rectifier T2 to point Z3, through connection 27, through winding SB2—now bearing a low voltage and marked L—in the same direction as the normal induced voltage therein, through connection 26 to point W4—back to winding SA2. The circulating feed-back excitation currents in the two local circuits thus provide unidirectional feed-back excitation during both positive and negative half-cycles which assist the supplementary excitation precisely as already described in connection with FIGURE 1.

The significance of the modified arrangement above described is, that with the orientation of the feed-back windings as shown in FIGURE 1A, the series connected windings SA1 and SB1 are together equivalent to a collective winding embracing limbs A1 and B1 of the two cores A and B, as are also the windings SB2 and SA2, the current circulating in each of the windings of a pair in the same direction, but where collective windings are employed the midpoints of same corresponding to W3 and W4 are not accessible—hence the effective mid-points are arranged to be at Z3—Z4 which provides equivalent results—thus feed-back windings and also excitation windings of the collective type embracing a limb of each core may be provided as an equivalent alternative to separate or individual windings arranged as shown in FIGURE 1A. It is necessary, of course, that as the feed-back and supplementary magnetisations are in mutually the same directions in the two cores when collective windings are employed, it is essential that the A.C. magnetisations are mutually opposite in direction to preserve the correct relationship.

FIGURE 6 shows a typical wave-form of the applied volts and also of the induced harmonic voltage, the former being shown at 12—one complete cycle of which is represented at Q1. The harmonic voltage is shown by the wave-form 13—one cycle of which is represented at Q2, the negative half-cycles of the latter as shown hatched being suppressed by the directional rectifier associated with the local feed-back circuits.

In the arrangement shown in FIGURE 1 a choke N has been included in the excitation circuit. The object of this device is that under some circumstances—more particularly in connection with single phase circuits—the inductive effects from the double frequency harmonic voltages is such that where induced currents from this source are allowed to circulate in the excitation windings it interferes with the ability of the supplementary excitation to provide the full amount of magnetic unbalance on which the self-excited feed-back system relies and the effect of the choke is to absorb the double frequency voltage component and prevent it circulating back through the excitation rectifier system during the favourable half cycles of same.

If it is desired that the control excitation to the excitation winding be variable the switch K may be replaced by a series regulator (not shown) or alternatively by a potentiometer regulator KR shown in broken line in FIGURE 1. When the regulator slider arm is at the end of the regulator connected to terminal Y, no excitation is supplied to the windings. Rotation of the arm in an anti-clockwise direction increases the excitation progressively to a maximum when the arm is at the end of the regulator connected to terminal X.

The motor M may be replaced by any other load and if required a suitable rectifier may be included so that the supply to the load proper is direct current.

Whilst the reactor units described are applicable mainly to single phase supply systems these may be adapted to operate on three-phase supply systems by employing three such units connected to the motor or load in "star" or "delta."

FIGURE 9 shows a typical arrangement employing three single phase units each arranged as in FIGURE 1 but omitting the separate feed-back windings thereby providing a simpler and more practical arrangement wherein the self-excited feed-back excitation is provided purely from the main windings. The reactors C1—C2 and C3 would be "star" connected between line L1 and terminal 41 of a three-phase squirrel cage motor M, L2 and motor terminal 42 and L3 and motor terminal 43 respectively. The motor M is shown as a "delta" wound machine but may equally well be arranged "star" wound. The reactors may be designed and connected in "delta" instead of "star" although the latter arrangement is preferable from the point of view that in the unexcited condition of the reactors C1, C2 and C3 the motor terminals 41, 42 and 43 will all be at practically zero potential mutually and will thus be equivalent to an "off" position condition, and will moreover be at ground potential if the supply system has an earthed neutral or its equivalent.

The excitation source of supply as shown in the diagram is derived from a three-phase rectified supply comprising a three-phase transformer R or its equivalent having its primary winding R$p$ connected to the three-phase supply system at L1, L2 and L3, the secondary windings R$s$ and the three-phase full-wave rectifier system T6 supplying current for the supplementary excitation from the + terminal through control switch K, connection 44 through the excitation winding system on reactor C1 connected in series parallel, through connection 45 to the excitation winding system on reactor C2 connected in series parallel, through connection 46—through the excitation winding system on reactor C3 also connected in series parallel, and back through connection 47 to the negative terminal on the excitation rectifier system. If a variable level of excitation is required, the switch K may be replaced by a regulator as already described with respect to FIGURE 1.

In the arrangement shown the excitation windings on the respective cores are connected in series in non-inductive relationship to the main A.C. magnetisation as in the single phase examples described, the two groups being connected in parallel but they may equally well be connected in series. The excitation windings of the units in the various phases are grouped together in series in open delta overall as shown more clearly in FIGURE 10 whereby any inductive voltages from the various phases either of a variable or non-variable character caused by the inherent unbalancing of the A.C. fluxes become self cancelling due to their open delta relationship whereby the sum of the individually induced voltages is zero at all times between the connections 44 and 47 between which the excitation supply voltage is applied preferably from a rectified three phase source as shown in FIGURE 9 as more nearly representing a D.C. supply. Excitation supplied from rectified single phase sources may however be employed if adequate smoothing is provided.

The interconnection of the excitation windings of the three reactors of FIGURE 9 is as shown in FIGURE 10 including the dotted connections but the most complete neutralisation of the inductive voltages is obtained when the connections shown dotted in FIGURE 10 are omitted.

As is well known in connection with saturable magnetic apparatus in general the excitation winding system whilst being arranged normally non inductive in respect of the A.C. magnetisations before excitation is applied fails to remain so when excitation is applied due to the unbalancing of the main fluxes as a result of the additive and subtractive characteristics of the A.C. fluxes in the respective cores of each pair and the uni-directional excitation fluxes and the arrangement described is claimed to overcome these fundamental difficulties.

The operation of the arrangement will be otherwise precisely as described in the single phase arrangements and may be arranged with or without separate feedback windings.

Alternatively the arrangement may be coupled in open-delta by omitting, say, the reactor C2 and connecting the motor terminal 42 direct to supply line L2 thus only two reactors would be employed. The supplementary excitation circuits would be connected and arranged as described above and grouped in series in partial open delta as will be understood by those skilled in these techniques when the unbalanced inductive effects will be partially or largely neutralised.

Where collective feed-back windings are employed these may be connected either in parallel providing two local circuits or in series to provide one local circuit completed by the directional rectifier or the windings may be unconnected mutually and bridged individually by a separate directional rectifier in each instance.

The examples shown, as already stated, are purely diagrammatic in that the windings may be arranged in various relative positions, as, for example, the two sets of main and feed-back windings may be arranged all on one limb, in which case only one excitation winding is necessary, and only one feed-back winding if of the collective type would be required embracing a pair of cores.

If the feedback excitation is to be provided wholly by the additional feedback windings it is merely necessary to omit the directional rectifier T1 connected across the local circuit at W1—W2 in FIGURES 1 and 9.

The feed-back arrangements so far described are assumed to provide positive feedback excitation but where negative feedback is required this may be provided, as shown in FIGURE 11, by means of a separate directional rectifier T1B oppositely polarised to the positive directional feedback rectifier connected across the mid-points of the windings W1—W2 (or W3—W4 or Z3—Z4 in the other figures) in series with an appropriate resistance R$n$ to control the amount of negative feed-back. This will permit feed-back excitation to flow around the main or feed-back windings in a direction opposite to that of the supplementary excitation when its effect will be subtractive therefrom. Such negative feedback or bias may be required in connection with certain protection arrangements.

As has already been explained the voltage existing across the mid-points of the main or feed-back winding systems is of double the supply frequency and the negative feed-back rectifier will allow the negative half cycles instead of the positive ones of this supply to pass through the biasing resistance R$n$ during each half cycle of the normal supply voltage frequency. It will thus be noted that positive and negative feed-back excitations have a mutual phase displacement of 180° as far as the double frequency A.C. voltage is concerned and are thus able to co-exist.

The positive feed-back excitation will of course be reduced by the amount of negative feed-back provided as is normally the case with conventional apparatus, but by omitting the negative feed-back rectifier T1B and using the resistance R$n$ only across the mid-points of the winding systems a circulating feed-back current will flow in the negative direction during the negative half cycles of the double frequency supply and will flow in the positive direction also at 180° later in the double frequency scale or 90° later according to the fundamental frequency scale. This flow in the positive direction will be additive to the positive feed-back, the result of which being that no reduction in the positive feed-back is produced by the co-existence of the negative feed-back at least within normal practical requirements.

What is claimed is:

1. A saturable reactor arrangement for connection in series with a load, comprising two closed magnetic cores each provided with a main winding consisting of two separate but identical portions or half-windings together with suitable supplementary excitation windings mutually non-inductively arranged with respect to the main or A.C. magnetisation, the two main half-windings on one core being connected in series with their counterpart half-windings on the other core, the two groups of windings thus formed being connected in parallel but mutually reversed, the main or A.C. fluxes in the two cores being respectively assisted and opposed by the supplementary excitation magnetisation when same is applied to the excitation windings from a D.C. or equivalent uni-directional source thereby causing a state of relative magnetic unbalance to arise between the fluxes in the two cores together with a corresponding relative unbalance of the instantaneous voltages across the main half-windings on each core comprising each group, whereby as a result of the mutually reversed parallel connection of the two winding groups, an A.C. voltage is produced between the junction or midpoints of the two winding groups—the frequency of which is double that of the supply system in consequence of the periodic saturation of the cores when the A.C. and D.C. fluxes are mutually assisting, between the said mid-points of the winding groups is connected a directional rectifier thereby establishing two local circuits each comprising two main windings in series one bearing a high and the other a low instantaneous voltage during, say, the positive half-cycles of the supply volts with the converse relationship during the negative half-cycle, each local circuit being completed by the directional rectifier common to both which permits a circulating current to flow through the main half windings comprising each local circuit simultaneously during say the positive half cycle of the double frequency source residing within each main winding group and which due to the fact that a positive and negative half cycle of same appears during both the positive and negative half-cycles of the normal frequency supply voltage, produces a self-excited feed-back excitation of the cores from the existing main winding system in the same direction as the supplementary excitation as determined by the polarity of the directional rectifier, thus assisting the latter excitation in reducing the impedance of the reactor from a high value in the unexcited condition, to a consistently low value over a wide load range when in the excited condition.

2. A reactor arrangement as claimed in claim 1 wherein an additional separate feed-back winding is provided on each of the two cores, each comprising two identical but separate half windings, the arrangement and connection of the separate half windings with a directional rectifier being the same or equivalent to those for the main winding so far as feed-back is concerned.

3. A reactor arrangement as claimed in claim 1, wherein an additional separate feed-back winding is provided on each of the two cores each comprising two identical but separate half windings each appropriately embracing the two cores collectively, the arrangement and connection of the windings with a common or separate directional rectifier being the same or equivalent to those for the main windings so far as feed-back is concerned.

4. A reactor arrangement as claimed in claim 1 wherein the supplementary excitation is provided by two identical half windings on each core, a half winding on one core being connected appropriately in series with a half winding on the other core so that they are mutually noninductive overall in respect to the main or A.C. magnetisation, the two groups being connected mutually in series.

5. A reactor arrangement as claimed in claim 1 wherein the supplementary excitation is provided by two identical half windings on each core, a half winding on one core being connected appropriately in series with a half winding on the other core so that they are mutually noninductive overall in respect of the main or A.C. magnetisation the two groups being connected mutually in parallel.

6. A reactor arrangement as claimed in claim 1 wherein the supplementary excitation is provided by two series or parallel connected windings, each of which collectively embraces both cores, wherein the A.C. fluxes circulate in mutually opposite directions.

7. A three phase arrangement comprising three reactor arrangements as claimed in claim 1, mutually connected with a load in star on a three phase supply system wherein the two groups of inductively neutralised excitation windings on each of the three reactors are connected in two open delta combinations each comprising an appropriate group of excitation windings from each reactor connected mutually in series, the two open delta combinations being connected in parallel overall thereby neutralising any mutually unbalanced inductive effects in the excitation winding system during the excited condition of the reactors.

8. A three phase arrangement comprising three reactor arrangements as claimed in claim 1, 2, 3, 4 or 5 mutually connected with a load in star on a three phase supply system wherein the two groups of inductively neutralised excitation windings on each of the three reactors are connected mutually in parallel and the groups connected in open delta combination overall thereby neutralising any mutually unbalanced inductive effects in the excitation winding system during the excited condition of the reactors.

9. A three phase arrangement comprising three reactor arrangements as claimed in claim 3, mutually connected with a load in star on a three phase supply system wherein the two groups of inductively neutralised supplementary excitation windings of each reactor are connected in series in open delta thereby neutralising any mutually unbalanced inductive effects in the excitation winding system in the excited condition of the reactors.

10. A three phase arrangement comprising two reactor arrangements as claimed in claim 3, mutually connected with a load in open delta on a three phase supply system wherein the supplementary excitation windings of each reactor are collectively connected in series in partial open delta thereby partially or largely neutralising any mutually unbalanced inductive effects in the excited condition of the reactors.

11. A reactor arrangement as claimed in claim 1 wherein a high frequency choke is included in the supplementary excitation circuit between the windings and the source.

12. A reactor arrangement as claimed in claim 1 wherein a small amount of negative feed-back or bias is provided by the connection in parallel with the aforementioned rectifier of a series combination of an additional rectifier and resistance, said additional rectifier being oppositely polarised to said first mentioned rectifier.

13. A reactor arrangement as claimed in claim 1 wherein a small amount of negative feed-back or bias is provided by a resistance connected between the mid-points of the main or feed-back winding groups.

14. A saturable reactor arrangement for connection in series with a load, comprising two closed magnetic cores each provided with a main winding consisting of two separate but identical portions or half-windings together with suitable supplementary excitation windings mutually non-inductively arranged with respect to the main or A.C. magnetisation, the two main half-windings on one core being connected in series with their counterpart half-windings on the other core, the two groups of windings thus formed being connected in parallel but mutually reversed, the main or A.C. fluxes in the two cores being respectively assisted and opposed by the supplementary excitation magnetisation when same is applied to the excitation windings from a D.C. or equivalent uni-directional source thereby causing a state of relative magnetic unbalance to arise between the fluxes in the two cores together with a corresponding relative unbalance of the instantaneous voltages across the main half-windings on each core comprising each group, an additional separate feedback winding on each of the two cores, each comprising two identical but separate half-windings arranged in the same relationship to each other as are the main half-windings so that the relative magnetic unbalance of the fluxes in the two cores results in the production of an A.C. voltage between the junction or mid-points of the two feedback winding groups—the frequency of which is double that of the supply system in consequence of the periodic saturation of the cores when the A.C. and D.C. fluxes are mutually assisting, between the said mid-points of the feedback winding groups is connected a directional rectifier thereby establishing two local circuits each comprising two feedback half-windings in series one bearing a high and the other a low instantaneous voltage during, say, the positive half-cycles of the supply volts with the converse relationship during the negative half-cycle, each local circuit being completed by the directional rectifier common to both which permits a circulating current to flow through the feedback half windings comprising each local circuit simultaneously during say the positive half cycle of the double frequency source residing within each feedback winding group and which due to the fact that a positive and negative half cycle of same appears during both the positive and negative half-cycles of the normal frequency supply voltage, produces a self-excited feedback excitation of the cores from the feedback winding system in the same direction as the supplementary excitation as determined by the polarity of the directional rectifier, thus assisting the latter excitation in reducing the impedance of the reactor from a high value in the unexcited condition, to a consistently low stable value over a wide load range when in the excited condition.

No references cited.